US009032942B2

(12) United States Patent
Suzuki (10) Patent No.: US 9,032,942 B2
(45) Date of Patent: May 19, 2015

(54) CONTROL APPARATUS AND CONTROL METHOD FOR INTERNAL COMBUSTION ENGINE

(71) Applicant: Takashi Suzuki, Gotenba (JP)

(72) Inventor: Takashi Suzuki, Gotenba (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 127 days.

(21) Appl. No.: 13/670,059

(22) Filed: Nov. 6, 2012

(65) Prior Publication Data

US 2013/0116911 A1 May 9, 2013

(30) Foreign Application Priority Data

Nov. 7, 2011 (JP) .................................. 2011-243368

(51) Int. Cl.
*F02D 41/00* (2006.01)
*F01N 11/00* (2006.01)
*F02D 41/02* (2006.01)

(52) U.S. Cl.
CPC ............ *F02D 41/024* (2013.01); *F02D 41/008* (2013.01); *F02D 2200/0802* (2013.01); *Y02T 10/26* (2013.01)

(58) Field of Classification Search
CPC . F02D 41/008; F02D 41/0085; F02D 41/024; F02D 41/0082; F02D 41/0245; F02D 41/0275
USPC .......... 701/103, 109; 123/673, 676, 691, 692, 123/406.2, 406.21, 406.29, 406.37, 406.44, 123/406.45, 406.47; 60/285, 286, 274, 276, 60/277
See application file for complete search history.

(56) References Cited

U.S. PATENT DOCUMENTS

| 5,911,682 | A * | 6/1999 | Kato et al. ....................... 60/276 |
| 6,244,043 | B1 * | 6/2001 | Farmer et al. ................... 60/274 |
| 6,691,507 | B1 * | 2/2004 | Meyer et al. ..................... 60/285 |
| 6,779,510 | B2 * | 8/2004 | Russell ..................... 123/406.47 |
| 7,774,130 | B2 * | 8/2010 | Pepper .......................... 701/123 |
| 8,649,957 | B2 * | 2/2014 | Yoshizaki et al. ............. 701/103 |
| 2003/0131588 | A1 * | 7/2003 | Schnaibel et al. .............. 60/284 |
| 2004/0261400 | A1 * | 12/2004 | Hiraku et al. ................... 60/277 |
| 2007/0017210 | A1 * | 1/2007 | Hirata et al. .................... 60/274 |
| 2008/0035132 | A1 * | 2/2008 | Katoh et al. ................... 123/673 |
| 2008/0255750 | A1 * | 10/2008 | Yasui et al. .................... 701/103 |
| 2010/0168986 | A1 * | 7/2010 | Iwazaki et al. ................ 701/103 |

FOREIGN PATENT DOCUMENTS

JP 11-257145 A 10/1999
JP 11-303664 A 11/1999

(Continued)

*Primary Examiner* — Lindsay Low
*Assistant Examiner* — George Jin
(74) *Attorney, Agent, or Firm* — Gifford, Krass, Sprinkle, Anderson & Citkowski, P.C.

(57) ABSTRACT

A control apparatus for an internal combustion engine including a plurality of combustion chambers and a catalyst that cleans exhaust gases includes a controller configured to execute individual air-fuel ratio control in which an air-fuel ratio of an air-fuel mixture generated in at least one non-specific combustion chamber is controlled such that an average air-fuel ratio of the engine matches a target air-fuel ratio, based on an air-fuel ratio of an air-fuel mixture generated in at least one specific combustion chamber, the controller being configured to execute catalyst temperature increase control in which a temperature of the catalyst is increased, and the controller being configured to prohibit execution of the individual air-fuel ratio control when the catalyst temperature increase control is executed.

3 Claims, 5 Drawing Sheets

(56) References Cited

FOREIGN PATENT DOCUMENTS

| JP | 2002-266682 A | 9/2002 |
| JP | 2004-225559 A | 8/2004 |
| JP | 2008-297933 A | 12/2008 |
| JP | 2009-002210 A | 1/2009 |

* cited by examiner

CONTROL APPARATUS AND CONTROL METHOD FOR INTERNAL COMBUSTION ENGINE

INCORPORATION BY REFERENCE

The disclosure of Japanese Patent Application No. 2011-243368 filed on Nov. 7, 2011 including the specification, drawings and abstract is incorporated herein by reference in its entirety.

BACKGROUND OF THE INVENTION

1. Field of the Invention

The invention relates to a control apparatus and a control method for an internal combustion engine.

2. Description of Related Art

An internal combustion engine is known, which includes a plurality of combustion chambers and a plurality of fuel injection valves that supply fuel to the respective combustion chambers. In the internal combustion engine, the amount of the fuel supplied to each combustion chamber from the corresponding fuel injection valve is individually controlled. In an internal combustion engine described in Japanese Patent Application Publication No. 2008-297933 (JP-2008-297933 A), in order to suppress a fluctuation in output torque (i.e., a fluctuation in torque output from the internal combustion engine) caused when an ignition timing (i.e., a timing when the fuel in the combustion chamber is ignited by an ignition plug) is retarded for increasing the temperature of a catalyst, the amount of the fuel supplied to each combustion chamber from the corresponding fuel injection valve is individually controlled.

As described above, in the internal combustion engine in which the amount of the fuel supplied to each combustion chamber from the corresponding fuel injection valve is individually controlled, more extensively in the internal combustion engine in which the air-fuel ratio of an air-fuel mixture generated in each combustion chamber is individually controlled, there are cases where, based on the air-fuel ratio of an exhaust gas discharged from one specific combustion chamber (hereinafter this combustion chamber is referred to as "a specific combustion chamber"), the air-fuel ratio of the air-fuel mixture generated in each of the rest of the combustion chambers (i.e., each of the cylinders except the specific combustion chamber; and hereinafter, each of the rest of the combustion chambers is referred to as "a non-specific combustion chamber") is controlled such that the average air-fuel ratio of the internal combustion engine matches a target air-fuel ratio (hereinafter this control is referred to as "individual air-fuel ratio control"). When the individual air-fuel ratio control is executed, there are cases where the average air-fuel ratio of the internal combustion engine matches the target air-fuel ratio in a state where the air-fuel ratio of the air-fuel mixture generated in the specific combustion chamber (hereinafter this air-fuel ratio is referred to as "a specific air-fuel ratio") is controlled to be leaner than the target air-fuel ratio and the air-fuel ratio of the air-fuel mixture generated in the non-specific combustion chamber (hereinafter this air-fuel ratio is referred to as "a non-specific air-fuel ratio") is controlled to be richer than the target air-fuel ratio. In addition, conversely, when the individual air-fuel ratio control is executed, there are cases where the average air-fuel ratio of the internal combustion engine matches the target air-fuel ratio in a state where the specific air-fuel ratio is controlled to be richer than the target air-fuel ratio and the non-specific air-fuel ratio is controlled to be leaner than the target air-fuel ratio.

Further, in a case where the specific air-fuel ratio is intentionally controlled to be leaner than the target air-fuel ratio for a particular purpose when the individual air-fuel ratio control is executed, the average air-fuel ratio of the internal combustion engine matches the target air-fuel ratio in a state where the specific air-fuel ratio is controlled to be leaner than the target air-fuel ratio and the non-specific air-fuel ratio is controlled to be richer than the target air-fuel ratio. Moreover, conversely, in a case where the specific air-fuel ratio is intentionally controlled to be richer than the target air-fuel ratio for a particular purpose when the individual air-fuel ratio control is executed, the average air-fuel ratio of the internal combustion engine matches the target air-fuel ratio in a state where the specific air-fuel ratio is controlled to be richer than the target air-fuel ratio and the non-specific air-fuel ratio is controlled to be leaner than the target air-fuel ratio.

In either case, when the individual air-fuel ratio control is executed, there are cases where the specific air-fuel ratio becomes a relatively lean air-fuel ratio or the non-specific air-fuel ratio becomes a relatively lean air-fuel ratio.

On the other hand, in a situation where the temperature of a catalyst needs to be increased, a misfire is likely to occur in the combustion chamber. Consequently, in a case where the individual air-fuel ratio control is executed when the temperature of the catalyst is increased and the specific or non-specific air-fuel ratio is controlled to a lean air-fuel ratio, a misfire is more likely to occur in the specific or non-specific combustion chamber. In a case where the misfire occurs in the specific or non-specific combustion chamber, exhaust emission characteristics are deteriorated.

SUMMARY OF THE INVENTION

The invention suppresses the occurrence of a misfire in a combustion chamber when the temperature of a catalyst is increased, thereby suppressing deterioration of exhaust emission characteristics, in an internal combustion engine in which individual air-fuel ratio control is executed.

A first aspect of the invention relates to a control apparatus for an internal combustion engine including a plurality of combustion chambers and a catalyst that cleans exhaust gases. The control apparatus includes a controller configured to execute individual air-fuel ratio control in which an air-fuel ratio of an air-fuel mixture generated in at least one non-specific combustion chamber is controlled such that an average air-fuel ratio of the internal combustion engine matches a target air-fuel ratio, based on an air-fuel ratio of an air-fuel mixture generated in at least one specific combustion chamber, the at least one specific combustion chamber being at least one of the plurality of combustion chambers, the at least one non-specific combustion chamber including the plurality of combustion chambers except the at least one specific combustion chamber. The controller is configured to execute catalyst temperature increase control in which a temperature of the catalyst is increased. In the first aspect of the invention, the controller is configured to prohibit execution of the individual air-fuel ratio control when the catalyst temperature increase control is executed.

According to the above aspect of the invention, the following effect is obtained. That is, when the catalyst temperature increase control is executed, the temperature of the internal combustion engine is relatively low and a misfire is likely to occur in the combustion chamber. In a case where the individual air-fuel ratio control is executed when the catalyst temperature increase control is executed and the air-fuel ratio of the air-fuel mixture generated in the specific combustion chamber (i.e., a specific air-fuel ratio) is controlled to a lean air-fuel ratio or the air-fuel ratio of the air-fuel mixture generated in the non-specific combustion chamber (i.e., a non-specific air-fuel ratio) is controlled to a lean air-fuel ratio, a misfire is more likely to occur in the specific combustion chamber or the non-specific combustion chamber. However, in the above aspect of the invention, when the catalyst temperature increase control is executed, the execution of the individual air-fuel ratio control is prohibited. Consequently, according to the above aspect of the invention, an effect is obtained that the occurrence of the misfire in the combustion chamber is suppressed when the catalyst temperature increase control is executed, and deterioration of exhaust emission characteristics is thereby suppressed.

In the above-described aspect of the invention, the internal combustion engine may further include an exhaust passage common to all of the combustion chambers, and an air-fuel ratio detection portion that detects an air-fuel ratio of the exhaust gas in the exhaust passage; and the controller may be configured to use, as the specific combustion chamber, the combustion chamber that discharges a highest sensitivity exhaust gas that is the exhaust gas whose air-fuel ratio is detected by the air-fuel ratio detection portion with the highest detection sensitivity among the exhaust gases discharged from the plurality of combustion chambers, and the controller may be configured to use the air-fuel ratio of the exhaust gas discharged from the specific combustion chamber detected by the air-fuel ratio detection portion as the air-fuel ratio of the air-fuel mixture generated in the specific combustion chamber in the individual air-fuel ratio control.

According to the above aspect of the invention, the following effect is obtained. That is, in a case where the combustion chamber discharging the highest sensitivity exhaust gas is the specific combustion chamber, according to the individual air-fuel ratio control, the non-specific air-fuel ratio is controlled based on the air-fuel ratio of the highest sensitivity exhaust gas. Herein, in a case where the individual air-fuel ratio control is executed when the catalyst temperature increase control is executed and the specific air-fuel ratio is controlled to a rich air-fuel ratio, the non-specific air-fuel ratio is controlled to a significantly lean air-fuel ratio. As a result, a misfire is very likely to occur in the non-specific combustion chamber. However, in the above aspect of the invention, when the catalyst temperature increase control is executed, the execution of the individual air-fuel ratio control is prohibited. Consequently, according to the above aspect of the invention, an effect is obtained that, in a situation where the misfire is very likely to occur in the combustion chamber if the individual air-fuel ratio control is executed, the occurrence of the misfire in the combustion chamber is suppressed and deterioration of exhaust emission characteristics is thereby suppressed.

In the above-described aspect of the invention, the internal combustion engine may further include a plurality of fuel supply portions that supply fuel to the corresponding combustion chambers, and the controller may be configured to control the air-fuel ratio of the air-fuel mixture generated in the at least one non-specific combustion chamber by controlling an amount of the fuel supplied to the at least one non-specific combustion chamber from at least one of the fuel supply portions, which corresponds to the at least one non-specific combustion chamber.

A second aspect of the invention relates to a control method for an internal combustion engine including a plurality of combustion chambers and a catalyst that cleans exhaust gases. The control method includes determining whether or not catalyst temperature increase control in which a temperature of the catalyst is increased is executed; and prohibiting, when it is determined that the catalyst temperature increase control is executed, execution of individual air-fuel ratio control in which an air-fuel ratio of an air-fuel mixture generated in at least one non-specific combustion chamber is controlled such that an average air-fuel ratio of the internal combustion engine matches a target air-fuel ratio, based on an air-fuel ratio of an air-fuel mixture generated in at least one specific combustion chamber, the at least one specific combustion chamber being at least one of the plurality of combustion chambers, and the at least one non-specific combustion chamber including the plurality of combustion chambers except the at least one specific combustion chamber.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 5A is a view showing a map used to acquire a reference fuel injection amount, while

DETAILED DESCRIPTION OF EMBODIMENTS

Figure 1:
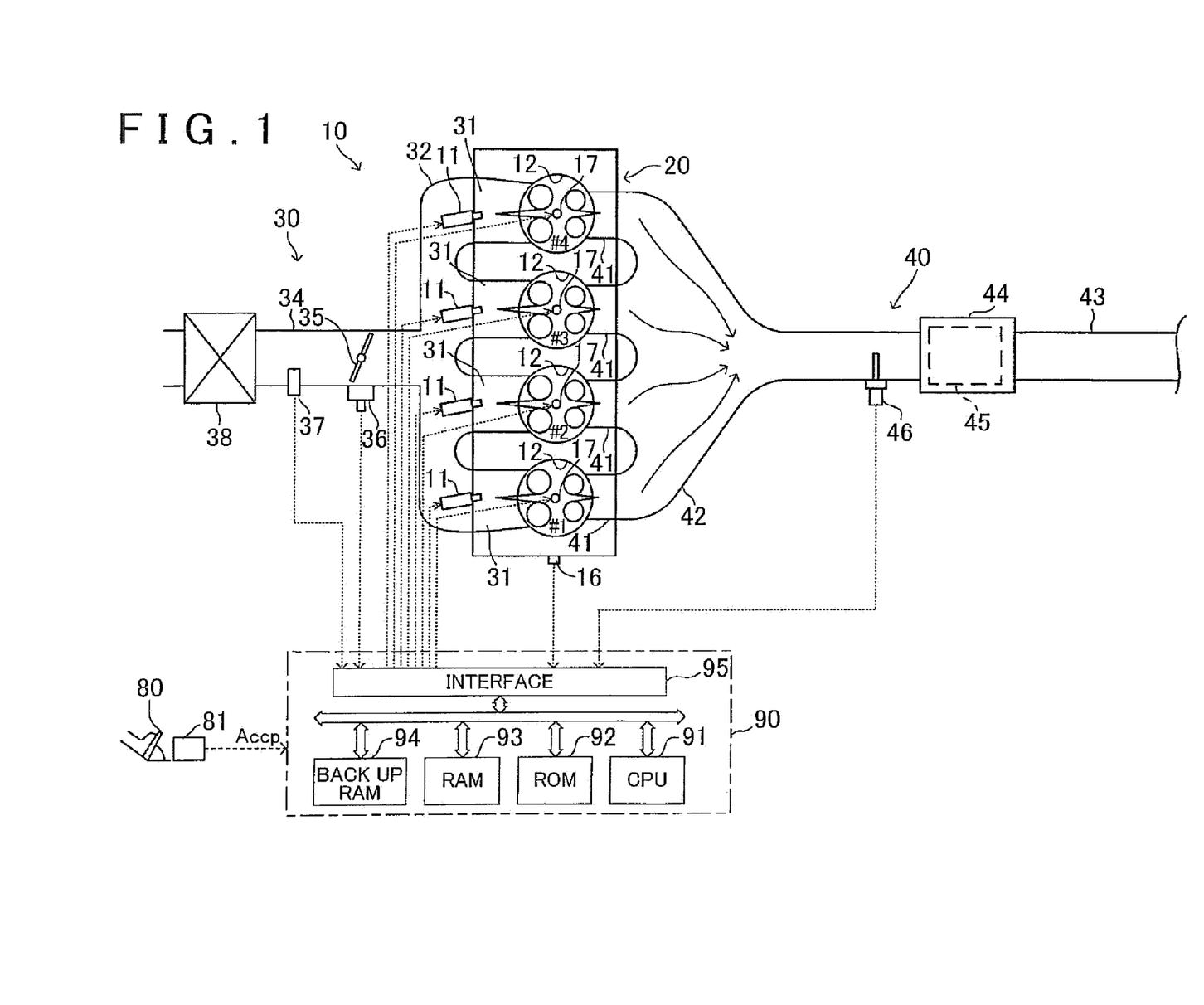
FIG. 1 is a view showing an internal combustion engine to which a control apparatus of the invention is applied.

Hereinbelow, embodiments of the invention are described. FIG. 1 shows an internal combustion engine to which a control apparatus of an embodiment of the invention (hereinafter referred to as "a first embodiment") is applied. An internal combustion engine 10 shown in FIG. 1 is a spark ignition internal combustion engine (what is called a gasoline engine). FIG. 1 shows fuel injection valves 11, combustion chambers 12, a crank position sensor 16, ignition plugs 17, an internal combustion engine main body 20, an accelerator pedal 80, and an accelerator pedal depression amount sensor 81.

In addition, FIG. 1 shows an intake passage 30, intake ports 31, an intake manifold 32, an intake pipe 34, a throttle valve 35, an actuator 36 for driving the throttle valve 35, an air flow meter 37, an air cleaner 38, an exhaust passage 40, exhaust ports 41, an exhaust manifold 42, an exhaust pipe 43, a catalytic converter 44, and an air-fuel ratio sensor 46. Note that the intake passage 30 is constituted by the intake ports 31, the intake manifold 32, and the intake pipe 34. On the other hand, the exhaust passage 40 is constituted by the exhaust ports 41, the exhaust manifold 42, and the exhaust pipe 43.

An electronic control unit 90 is composed of a microcomputer. More specifically, the electronic control unit 90 includes a microprocessor (CPU) 91, a read only memory (ROM) 92, a random access memory (RAM) 93, a back-up RAM 94, and an interface 95. The CPU 91, the ROM 92, the RAM 93, the back-up RAM 94, and the interface 95 are mutually connected to each other via a bi-directional bus.

Next, a detailed description is given of individual elements constituting the above-described internal combustion engine. Note that, in the following description, "a fuel injection amount" means "the amount of fuel injected from the fuel injection valve", "a target fuel injection amount" means "the target value of the fuel injection amount", "a target ignition timing" means "the target value of a timing when the fuel in the combustion chamber is ignited by the ignition plug", "an engine rotation speed" means "the number of revolutions of the internal combustion engine", "a throttle valve opening degree" means "the opening degree of the throttle valve", "an intake air amount" means "the amount of air sucked in the combustion chamber", "a target intake air amount" means "the target value of the intake air amount", "an air-fuel mixture" means "gas generated in the combustion chamber in which air and fuel are mixed together", "an accelerator pedal depression amount" means "the depression amount of the accelerator pedal", and "a required engine torque" means "a torque required as a torque output from the internal combustion engine".

The internal combustion engine 10 includes four combustion chambers 12 and four fuel injection valves 11. Each of the fuel injection valves 11 is attached to the internal combustion engine main body 20 such that the fuel injection hole of the fuel injection valve 11 is exposed in the intake port 31 corresponding to the combustion chamber 12. In addition, the fuel injection valve 11 is electrically connected to the interface 95 of the electronic control unit 90. The electronic control unit 90 supplies, to the fuel injection valve 11, a command signal for causing the fuel injection valve 11 to inject the fuel in the target fuel injection amount at a target fuel injection timing. When the command signal is supplied to the fuel injection valve 11 from the electronic control unit 90, the fuel injection valve 11 injects the fuel into the corresponding intake port 31.

Further, the internal combustion engine 10 includes the four ignition plugs 17. Each of the ignition plugs 17 is attached to the internal combustion engine main body 20 such that the discharge electrode of the ignition plug 17 is exposed in the corresponding combustion chamber 12. Furthermore, the ignition plug 17 is electrically connected to the interface 95 of the electronic control unit 90. The electronic control unit 90 supplies, to the ignition plug 17, a command signal for causing the ignition plug 17 to generate a spark at the target ignition timing. When the command signal is supplied to the ignition plug 17 from the electronic control unit 90, the ignition plug 17 ignites the fuel in the combustion chamber 12. Note that, when the fuel in the combustion chamber 12 is ignited by the ignition plug 17, the fuel in the combustion chamber 12 is combusted and a torque is output to a crankshaft (not shown) via a piston (not shown) and a connecting rod (not shown).

The crank position sensor 16 is disposed in the vicinity of an output shaft of the internal combustion engine, i.e., in the vicinity of the crankshaft. In addition, the crank position sensor 16 is electrically connected to the interface 95 of the electronic control unit 90. The crank position sensor 16 outputs an output value corresponding to the rotation phase of the crankshaft. The output value is input to the electronic control unit 90. The electronic control unit 90 calculates the engine rotation speed based on the output value.

The intake manifold 32 is branched into a plurality of pipes at one end of the intake manifold 32, and the pipes are connected to the corresponding intake ports 31. In addition, the other end of the intake manifold 32 is connected to one end of the intake pipe 34.

The throttle valve 35 is disposed in the intake pipe 34. The actuator 36 for changing the opening degree of the throttle valve 35 (hereinafter this actuator is referred to as "a throttle valve actuator 36") is connected to the throttle valve 35. The throttle valve actuator 36 is electrically connected to the interface 95 of the electronic control unit 90. The electronic control unit 90 supplies, to the throttle valve actuator 36, a control signal for driving the throttle valve actuator 36 such that the throttle valve opening degree is controlled to an opening degree at which the target intake air amount is achieved. Note that, when the throttle valve opening degree is changed, a flow passage area in the intake pipe 34 is changed, that is, a flow passage area in a region where the throttle valve 35 is disposed is changed. With this, the amount of air passing through the throttle valve 35 is changed, and accordingly the amount of air sucked in the combustion chamber is changed.

The air flow meter 37 is disposed in the intake passage 30 (more specifically disposed in the intake pipe 34) at a position upstream of the throttle valve 35. In addition, the air flow meter 37 is electrically connected to the interface 95 of the electronic control unit 90. The air flow meter 37 outputs an output value corresponding to the amount of air passing through the air flow meter 37. The output value is input to the electronic control unit 90. The electronic control unit 90 calculates the amount of the air passing through the air flow meter 37, and accordingly the intake air amount, based on the output value.

The air cleaner 38 is disposed in the intake passage 30 (more specifically disposed in the intake pipe 34) at a position upstream of the air flow meter 37.

The exhaust manifold 42 is branched into a plurality of pipes at one end of the exhaust manifold 42, and the pipes are connected to the corresponding exhaust ports 41. In addition, the other end of the exhaust manifold 42 is connected to one end of the exhaust pipe 43. The other end of the exhaust pipe 43 is opened to the outside.

The catalytic converter 44 is disposed in the exhaust passage 40 (more specifically disposed in the exhaust pipe 43). In addition, the catalytic converter 44 accommodates a catalyst 45 in its internal portion. The catalyst 45 is what is called a three-way catalyst capable of simultaneously removing nitrogen oxides (NOx), carbon monoxide (CO), and unburned hydrocarbon (HC) in an exhaust gas at a high cleaning rate when the air-fuel ratio of the exhaust gas flowing into the catalyst 45 corresponds to a stoichiometric air-fuel ratio. Note that the air-fuel ratio of the exhaust gas means the ratio of the amount of air sucked in the combustion chamber 12 (i.e., the intake air amount) to the amount of fuel supplied to the combustion chamber 12 (i.e., the fuel injection amount), and substantially corresponds to the air-fuel ratio of the air-fuel mixture.

Figure 2:
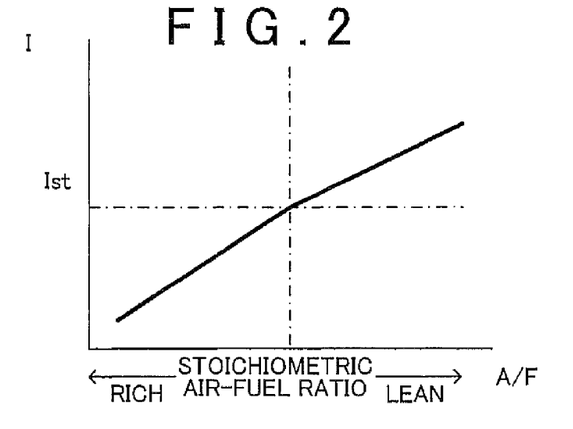
FIG. 2 is a view showing output characteristics of an air-fuel ratio sensor.

The air-fuel ratio sensor 46 is attached to the exhaust passage 40 (more specifically attached to the exhaust pipe 43) at a position upstream of the catalytic converter 44. In addition, the air-fuel ratio sensor 46 is electrically connected to the interface 95 of the electronic control unit 90. The air-fuel ratio sensor 46 outputs an output value corresponding to the air-fuel ratio of the exhaust gas reaching the air-fuel ratio sensor 46. The output value is input to the electronic control unit 90. The electronic control unit 90 calculates the air-fuel ratio of the exhaust gas reaching the air-fuel ratio sensor 46 based on the output value. Consequently, the air-fuel ratio sensor 46 can be said to be a sensor that detects the air-fuel ratio of the exhaust gas reaching the air-fuel ratio sensor 46. Note that the air-fuel ratio sensor 46 is not limited to any particular sensor as long as the air-fuel ratio sensor 46 detects the air-fuel ratio of the exhaust gas reaching the air-fuel ratio sensor 46, and as the air-fuel ratio sensor 46, what is called a limiting current oxygen concentration sensor having output characteristics shown in FIG. 2 can be used. As shown in FIG. 2, the oxygen concentration sensor outputs a larger current value as an output value, as the air-fuel ratio of the exhaust gas reaching the oxygen concentration sensor is larger. In addition, in the following description, the air-fuel ratio detected by the air-fuel ratio sensor is referred to as "a detected air-fuel ratio".

The accelerator pedal depression amount sensor 81 is connected to the accelerator pedal 80. In addition, the accelerator pedal depression amount sensor 81 is electrically connected to the interface 95 of the electronic control unit 90. The accelerator pedal depression amount sensor 81 outputs an output value corresponding to the accelerator pedal depression amount. The output value is input to the electronic control unit 90. The electronic control unit 90 calculates the accelerator pedal depression amount, and accordingly the required engine torque, based on the output value.

Next, a description is given of catalyst temperature increase control of the first embodiment. Note that, in the following description, "a catalyst temperature" means "the temperature of the catalyst". In the first embodiment, when the catalyst temperature is lower than a predetermined temperature (hereinafter this temperature is referred to as "a predetermined catalyst temperature"), the catalyst temperature increase control in which the temperature of the catalyst is increased is executed. On the other hand, when the catalyst temperature is equal to or higher than the predetermined catalyst temperature, the catalyst temperature increase control is suspended.

Subsequently, a description is given of air-fuel ratio control of the first embodiment. Note that, in the following description, "the average air-fuel ratio of the internal combustion engine" means "a value obtained by averaging the air-fuel ratios of the air-fuel mixtures generated in the combustion chambers", and "a target air-fuel ratio" means "the target value of the air-fuel ratio of the air-fuel mixture generated in each combustion chamber". In the air-fuel ratio control of the first embodiment, during the operation of the engine, when the catalyst temperature increase control is not executed, individual air-fuel ratio control is executed and, when the catalyst temperature increase control is executed, the execution of the individual air-fuel ratio control is prohibited and air-fuel ratio control other than the individual air-fuel ratio control (hereinafter this air-fuel ratio control is referred to as "non-individual air-fuel ratio control") is executed. The individual air-fuel ratio control of the first embodiment mentioned herein is air-fuel ratio control in which, based on the air-fuel ratio of the air-fuel mixture generated in one combustion chamber (hereinafter this combustion chamber is referred to as "a specific combustion chamber"), the air-fuel ratio of the air-fuel mixture generated in each of the rest of the combustion chambers (i.e., each of the combustion chambers except the specific combustion chamber; and hereinafter each of the rest of the combustion chambers is referred to as "a non-specific combustion chamber") is controlled such that the average air-fuel ratio of the internal combustion engine matches the target air-fuel ratio.

According to the first embodiment, the following effect is obtained. That is, when the catalyst temperature increase control is executed, the temperature of the internal combustion engine is relatively low and a misfire is likely to occur in the combustion chamber. In a case where the individual air-fuel ratio control is executed when the catalyst temperature increase control is executed, and the air-fuel ratio of the air-fuel mixture generated in the specific combustion chamber (hereinafter this air-fuel ratio is referred to as "a specific air-fuel ratio") is controlled to a lean air-fuel ratio or the air-fuel ratio of the air-fuel mixture generated in the non-specific combustion chamber (hereinafter this air-fuel ratio is referred to as "a non-specific air-fuel ratio") is controlled to a lean air-fuel ratio, a misfire is more likely to occur in the specific combustion chamber or the non-specific combustion chamber. However, in the first embodiment, when the catalyst temperature increase control is executed, the execution of the individual air-fuel ratio control is prohibited. Consequently, according to the first embodiment, the effect is obtained that the occurrence of the misfire in the combustion chamber is suppressed when the catalyst temperature increase control is executed and deterioration of exhaust emission characteristics is thereby suppressed.

Note that, in the first embodiment, for example, the detected air-fuel ratio of the exhaust gas discharged from the specific combustion chamber is used as the specific air-fuel ratio. In addition, in the first embodiment, for example, the stoichiometric air-fuel ratio is used as the target air-fuel ratio.

Figure 3:
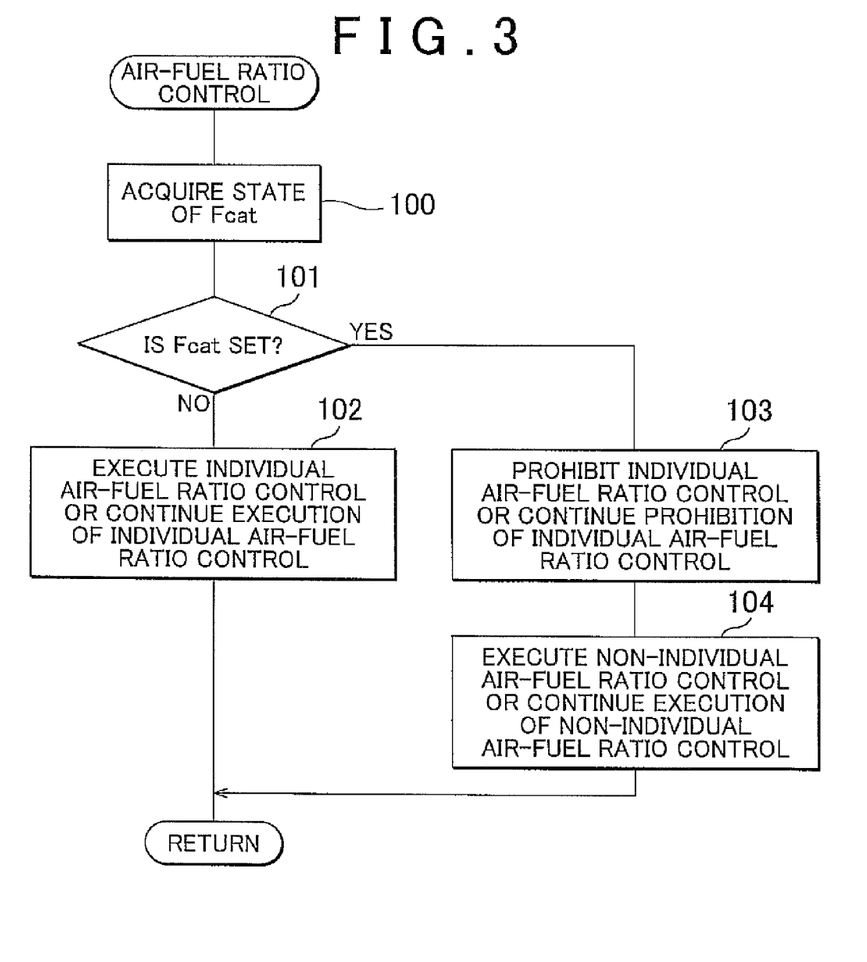
FIG. 3 is a view showing an example of a routine for executing air-fuel ratio control of a first embodiment.

Next, a description is given of an example of a routine for executing the air-fuel ratio control of the first embodiment. FIG. 3 shows the example of the routine. Note that this routine is started every time a predetermined crank angle is reached. When the routine of FIG. 3 is started, firstly in Step 100, the state of a catalyst temperature increase control execution flag Fcat is acquired. The flag is set when the catalyst temperature increase control is executed, and is reset when the catalyst temperature increase control is suspended. For example, the flag is set in Step 203 of FIG. 4, and is reset in Step 205 of FIG. 4. Subsequently, in Step 101, it is determined whether or not the catalyst temperature increase control execution flag Fcat acquired in Step 100 is set. When it is determined that the catalyst temperature increase control execution flag Fcat is not set, the routine proceeds to Step 102. On the other hand, when it is determined that the catalyst temperature increase control execution flag Fcat is set, the routine proceeds to Step 103.

In Step 102, the individual air-fuel ratio control is executed or the execution of the individual air-fuel ratio control is continued when the individual air-fuel ratio control is already executed and, thereafter, the routine is ended.

In Step 103, the execution of the individual air-fuel ratio control is prohibited or the prohibition of the individual air-fuel ratio control is continued when the execution of the individual air-fuel ratio control is already prohibited. Then, in Step 104, the non-individual air-fuel ratio control is executed or the execution of the non-individual air-fuel ratio control is continued when the non-individual air-fuel ratio control is already executed and, thereafter, the routine is ended.

Figure 4:
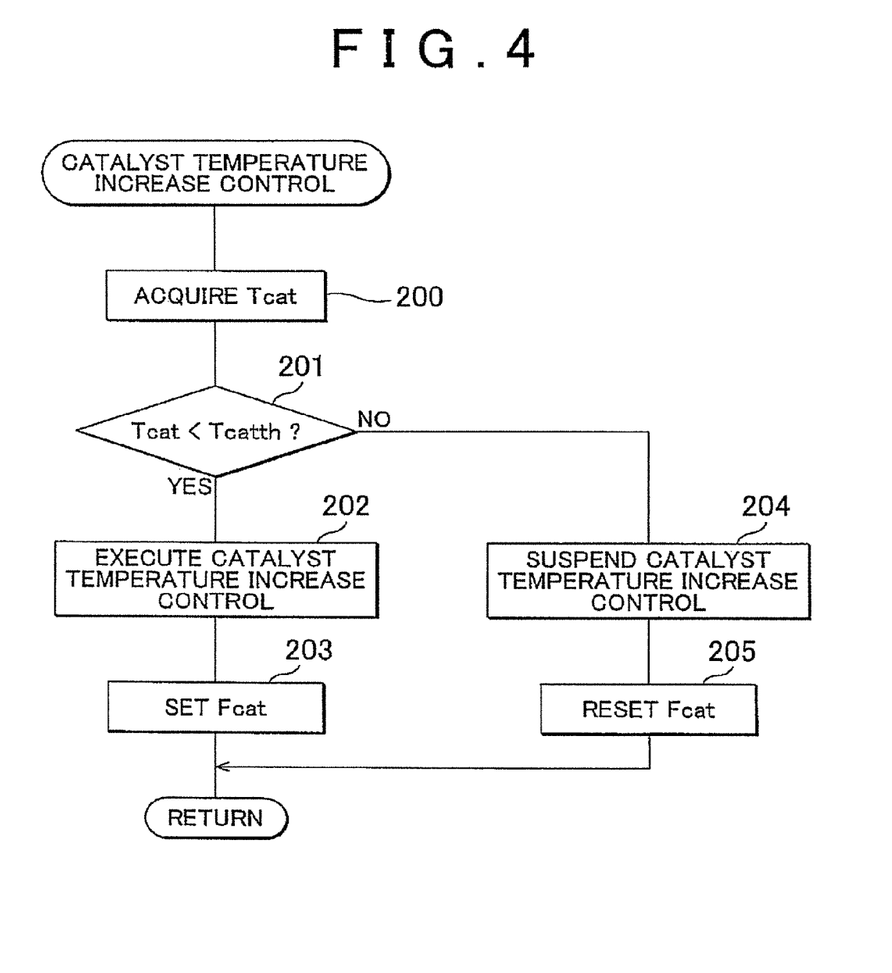
FIG. 4 is a view showing an example of a routine for executing catalyst temperature increase control of the first embodiment.

Next, a description is given of an example of a routine for executing the catalyst temperature increase control of the first embodiment. FIG. 4 shows the example of the routine. Note that the routine is started every time a predetermined crank angle is reached. When the routine of FIG. 4 is started, firstly in Step 200, a catalyst temperature Tcat is acquired. Then, it is determined whether or not the catalyst temperature Tcat acquired in Step 200 is lower than a predetermined catalyst temperature Tcatth (Tcat<Tcatth). When it is determined that Tcat<Tcatth is satisfied, the routine proceeds to Step 202. On the other hand, when it is determined that the catalyst temperature Tcat is equal to or higher than the predetermined catalyst temperature Tcatth (Tcat<Tcatth is not satisfied), the routine proceeds to Step 204.

In Step 202, the catalyst temperature increase control is executed or the execution of the catalyst temperature increase control is continued when the catalyst temperature increase control is already executed. Subsequently, in Step 203, the catalyst temperature increase control execution flag Fcat is set and, thereafter, the routine is ended.

In Step 204, the catalyst temperature increase control is suspended or the suspension of the catalyst temperature increase control is continued when the catalyst temperature increase control is already suspended. Next, in Step 205, the catalyst temperature increase control execution flag Fcat is reset and, thereafter, the routine is ended.

Note that the predetermined catalyst temperature of the first embodiment may be a temperature determined as the catalyst temperature for various reasons. For example, the catalyst temperature required to allow the catalyst to fully perform the function of cleaning the exhaust gas can be adopted as the predetermined catalyst temperature.

In addition, in the catalyst temperature increase control of the first embodiment, for example, an ignition timing later than the target ignition timing set in accordance with the engine operation state when the catalyst temperature increase control is not executed is set as the target ignition timing, and the fuel in each combustion chamber is ignited at the set target ignition timing by the ignition plug.

Next, a description is given of individual air-fuel ratio control that can be adopted as the individual air-fuel ratio control of the first embodiment. Note that, in the following description, an embodiment in which the adoptable individual air-fuel ratio control is adopted is referred to as "a second embodiment". In addition, in the following description, "the engine operation state" means "the operation state of the internal combustion engine", "the target fuel injection amount associated with the specific combustion chamber" means "the target value of the injection amount of the fuel injected from the fuel injection valve disposed in association with the specific combustion chamber", and "the target fuel injection amount associated with the non-specific combustion chamber" means "the target value of the injection amount of the fuel injected from the fuel injection valve disposed in association with the non-specific combustion chamber".

Figure 5A:
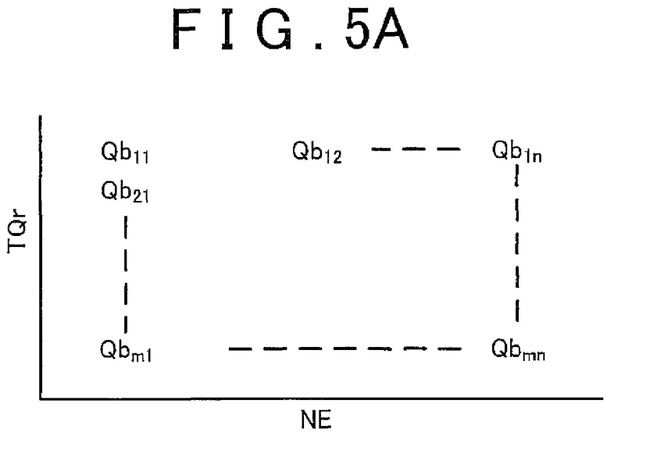
Figure 5B:
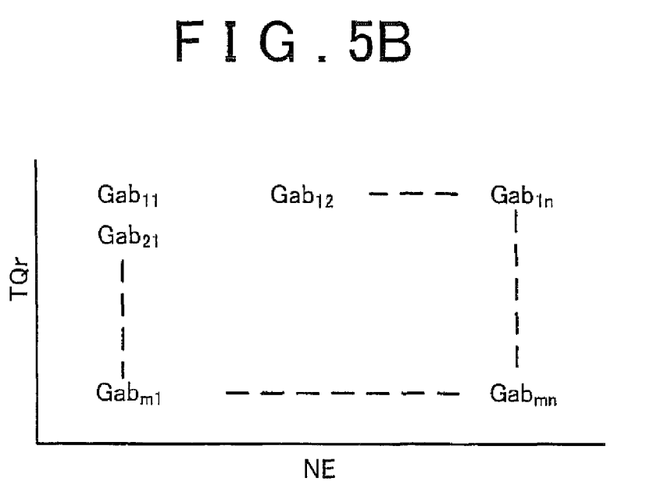
FIG. 5B is a view showing a map used to acquire a reference intake air amount.

In the second embodiment, the adequate fuel injection amount is predetermined by means of a test or the like according to the engine operation state defined by the engine rotation speed and the required engine torque. As shown in FIG. 5A, the determined fuel injection amount is stored in the electronic control unit as a reference fuel injection amount Qb in the form of a map of a function of an engine rotation speed NE and a required engine torque TQr. In addition, in the second embodiment, the intake air amount adequate to achieve the target air-fuel ratio is predetermined by means of a test or the like according to the engine operation state defined by the engine rotation speed and the required engine torque. As shown in FIG. 5B, the determined intake air amount is stored in the electronic control unit as a reference intake air amount Gab in the form of the map of the function of the engine rotation speed NE and the required engine torque TQr.

In the individual air-fuel ratio control of the second embodiment, during the operation of the engine, the reference fuel injection amount Qb corresponding to the present engine rotation speed NE and the present required engine torque TQr is acquired from the map of FIG. 5A. Subsequently, the acquired reference fuel injection amount Qb is set as the target fuel injection amount associated with the specific combustion chamber, and a value obtained by correcting the acquired reference fuel injection amount Qb with an air-fuel ratio correction factor is set as the target fuel injection amount associated with the non-specific combustion chamber.

More specifically, for example, as shown in the following equation (1), the acquired reference fuel injection amount Qb is set as the target fuel injection amount associated with the specific combustion chamber and, as shown in the following equation (1), the value obtained by multiplying the acquired reference fuel injection amount Qb by an air-fuel ratio correction factor Kaf is set as a target fuel injection amount Qtr associated with the non-specific combustion chamber.

$$Qtr = Qb \times Kaf \quad (1)$$

In addition, during the operation of the engine, the reference intake air amount Gab corresponding to the present engine rotation speed NE and the present required engine torque TQr is acquired from the map of FIG. 5B. Subsequently, the acquired reference intake air amount Gab is set as the target intake air amount.

Then, a command signal for causing each fuel injection valve to inject the fuel in the set target fuel injection amount is calculated based on the target fuel injection amount, and the calculated command signal is supplied to each fuel injection valve. Further, a control signal for controlling the throttle valve such that the throttle valve opening degree is controlled so as to achieve the set target intake air amount is supplied to the throttle valve actuator.

Next, a description is given of the air-fuel ratio correction factor of the second embodiment. In the second embodiment, when the detected air-fuel ratio of the exhaust gas discharged from the specific combustion chamber (hereinafter this exhaust gas is referred to as "a specific exhaust gas") is larger than the target air-fuel ratio (that is, when the detected air-fuel ratio of the specific exhaust gas is leaner than the target air-fuel ratio), the air-fuel ratio correction factor is increased. With this, if the reference fuel injection amount is constant, the target fuel injection amount associated with the non-specific combustion chamber is increased, and hence the non-specific air-fuel ratio is reduced and, as a result, the average air-fuel ratio of the internal combustion engine approaches the target air-fuel ratio. On the other hand, in the second embodiment, when the detected air-fuel ratio of the specific exhaust gas is smaller than the target air-fuel ratio (that is, when the detected air-fuel ratio of the specific exhaust gas is richer than the target air-fuel ratio), the air-fuel ratio correction factor is reduced. With this, if the reference fuel injection amount is constant, the target fuel injection amount associated with the non-specific combustion chamber is reduced, and hence the non-specific air-fuel ratio is increased and, as a result, the average air-fuel ratio of the internal combustion engine approaches the target air-fuel ratio.

Note that the amount of the increase in the air-fuel ratio correction factor when the detected air-fuel ratio of the specific exhaust gas is larger than the target air-fuel ratio is preferably an amount that does not allow the average air-fuel ratio of the internal combustion engine to become smaller than the target air-fuel ratio when the fuel in the target fuel injection amount associated with the non-specific combustion chamber set by using the increased air-fuel ratio correction factor is injected from the fuel injection valve. For example, it is possible to adopt, as this amount of the increase in the air-fuel ratio correction factor, an amount calculated when the average air-fuel ratio of the internal combustion engine is controlled so as to correspond to the target air-fuel ratio by increasing the air-fuel ratio correction factor by proportional-integral-derivative (PID) control. Similarly, the amount of the reduction in the air-fuel ratio correction factor when the detected air-fuel ratio of the specific exhaust gas is smaller than the target air-fuel ratio is preferably an amount that does not allow the average air-fuel ratio of the internal combustion engine to become larger than the target air-fuel ratio when the fuel in the target fuel injection amount associated with the non-specific combustion chamber set by using the reduced air-fuel ratio correction factor is injected from the fuel injection valve. For example, it is possible to adopt, as the amount of the reduction in the air-fuel ratio correction factor, an amount calculated when the average air-fuel ratio of the internal combustion engine is controlled so as to correspond to the target air-fuel ratio by reducing the air-fuel ratio correction factor by the PID control.

Next, a description is given of air-fuel ratio control of a third embodiment. Note that the configuration and the control of the third embodiment that are not described below are the same as those of the first embodiment, or the configuration and the control that are naturally derived from those of the first embodiment in view of the configuration and the control of the third embodiment described below.

In the air-fuel ratio control of the third embodiment, during the operation of the engine, when the catalyst temperature increase control is not executed, individual air-fuel ratio control is executed and, when the catalyst temperature increase control is executed, the execution of the individual air-fuel ratio control is prohibited and the air-fuel ratio control other than the individual air-fuel ratio control (i.e., the non-individual air-fuel ratio control) is executed. The individual air-fuel ratio control of the third embodiment mentioned herein is air-fuel ratio control in which the specific air-fuel ratio is controlled to a leaner air-fuel ratio for a particular purpose and, based on the specific air-fuel ratio at this time, the non-specific air-fuel ratio is controlled to a richer air-fuel ratio such that the average air-fuel ratio of the internal combustion engine matches the target air-fuel ratio.

According to the third embodiment, the following effect is obtained. That is, according to the individual air-fuel ratio control of the third embodiment, the specific air-fuel ratio is controlled to a leaner air-fuel ratio. If the catalyst temperature increase control is executed in this case, a misfire is likely to occur in the specific combustion chamber. However, in the third embodiment, when the catalyst temperature increase control is executed, the execution of the individual air-fuel ratio control is prohibited. Consequently, according to the third embodiment, an effect is obtained that the occurrence of the misfire in the combustion chamber is suppressed when the catalyst temperature increase control is executed, and deterioration of exhaust emission characteristics is thereby suppressed.

Next, a description is given of individual air-fuel ratio control that can be adopted as the individual air-fuel ratio control of the third embodiment. Note that, in the following description, an embodiment in which the adoptable individual air-fuel ratio control is adopted is referred to as "a fourth embodiment".

In the individual air-fuel ratio control of the fourth embodiment, during the operation of the engine, the reference fuel injection amount Qb corresponding to the present engine rotation speed NE and the present required engine torque TQr is acquired from the map of FIG. 5A. Subsequently, a value obtained by correcting the acquired reference fuel injection amount Qb with an individual correction factor is set as the target fuel injection amount associated with the specific combustion chamber, and a value obtained by correcting the acquired reference fuel injection amount Qb with the air-fuel ratio correction factor is set as the target fuel injection amount associated with the non-specific combustion chamber.

More specifically, for example, as shown in the following equation (2), the value obtained by multiplying the acquired reference fuel injection amount Qb by an individual correction factor Kid is set as a target fuel injection amount Qts associated with the specific combustion chamber and, as shown in the following equation (3), the value obtained by multiplying the acquired reference fuel injection amount Qb by the air-fuel ratio correction factor Kaf is set as the target fuel injection amount Qtr associated with the non-specific combustion chamber. Note that the individual correction factor Kid in the following equation (2) is a value smaller than "1", and the air-fuel ratio correction factor in the following equation (3) is the same as the air-fuel ratio correction factor of the second embodiment.

$$Qts = Qb \times Kid \qquad (2)$$

$$Qtr = Qb \times Kaf \qquad (3)$$

In addition, during the operation of the engine, the reference intake air amount Gab corresponding to the present engine rotation speed NE and the present required engine torque TQr is acquired from the map of FIG. 5B. Subsequently, the acquired reference intake air amount Gab is set as the target intake air amount.

Then, the command signal for causing each fuel injection valve to inject the fuel in the set target fuel injection amount is calculated based on the target fuel injection amount. The calculated command signal is supplied to each fuel injection valve. Further, the control signal for controlling the throttle valve such that the throttle valve opening degree is controlled so as to achieve the set target intake air amount is supplied to the throttle valve actuator.

Next, a description is given of air-fuel ratio control of a fifth embodiment. Note that the configuration and the control of the fifth embodiment that are not described below are the same as those of the first embodiment, or the configuration and the control that are naturally derived from those of the first embodiment in view of the configuration and the control of the fifth embodiment described below.

In the air-fuel ratio control of the fifth embodiment, during the operation of the engine, when the catalyst temperature increase control is not executed, individual air-fuel ratio control is executed and, when the catalyst temperature increase control is executed, the execution of the individual air-fuel ratio control is prohibited and the air-fuel ratio other than the individual air-fuel ratio control (i.e., the non-individual air-fuel ratio control) is executed. The individual air-fuel ratio control of the fifth embodiment mentioned herein is air-fuel ratio control in which the specific air-fuel ratio is controlled to a richer air-fuel ratio for a particular purpose and, based on the specific air-fuel ratio at this time, the non-specific air-fuel ratio is controlled to a leaner air-fuel ratio such that the average air-fuel ratio of the internal combustion engine matches the target air-fuel ratio.

According to the fifth embodiment, the following effect is obtained. That is, according to the individual air-fuel ratio control of the fifth embodiment, the non-specific air-fuel ratio is controlled to a leaner air-fuel ratio. If the catalyst temperature increase control is executed in this case, a misfire is likely to occur in the non-specific combustion chamber. However, in the fifth embodiment, when the catalyst temperature increase control is executed, the execution of the individual air-fuel ratio control is prohibited. Consequently, according to the fifth embodiment, an effect is obtained that the occurrence of the misfire in the combustion chamber is suppressed when the catalyst temperature increase control is executed, and deterioration of exhaust emission characteristics is thereby suppressed.

Next, a description is given of individual air-fuel ratio control that can be adopted as the individual air-fuel ratio control of the fifth embodiment. Note that, in the following description, an embodiment in which the adoptable individual air-fuel ratio control is adopted is referred to as "a sixth embodiment".

In the individual air-fuel ratio control of the sixth embodiment, during the operation of the engine, the reference fuel injection amount Qb corresponding to the present engine rotation speed NE and the present required engine torque TQr is acquired from the map of FIG. 5A. Subsequently, a value obtained by correcting the acquired reference fuel injection amount Qb with an individual correction factor is set as the target fuel injection amount associated with the specific combustion chamber. A value obtained by correcting the acquired reference fuel injection amount Qb with the air-fuel ratio correction factor is set as the target fuel injection amount associated with the non-specific combustion chamber.

More specifically, for example, as shown in the following equation (4), the value obtained by multiplying the acquired reference fuel injection amount Qb by an individual correction factor Kii is set as the target fuel injection amount Qts associated with the specific combustion chamber. As shown in the following equation (5), the value obtained by multiplying the acquired reference fuel injection amount Qb by the air-fuel ratio correction factor Kaf is set as the target fuel injection amount Qtr associated with the non-specific combustion chamber. Note that the individual correction factor Kii in the following equation (4) is a value larger than "1", and the air-fuel ratio correction factor in the following equation (5) is the same as the air-fuel ratio correction factor of the second embodiment.

$$Qts = Qb \times Kii \tag{4}$$

$$Qtr = Qb \times Kaf \tag{5}$$

In addition, during the operation of the engine, the reference intake air amount Gab corresponding to the present engine rotation speed NE and the present required engine torque TQr is acquired from the map of FIG. 5B. Subsequently, the acquired reference intake air mount Gab is set as the target intake air amount.

Then, the command signal for causing each fuel injection valve to inject the fuel in the set target fuel injection amount is calculated based on the target fuel injection amount. The calculated command signal is supplied to each fuel injection valve. Further, the control signal for controlling the throttle valve such that the throttle valve opening degree is controlled so as to achieve the set target intake air amount is supplied to the throttle valve actuator.

Note that, the specific combustion chamber in each of the above embodiments may be the combustion chamber that discharges the exhaust gas whose air-fuel ratio is detected by the air-fuel ratio sensor with the highest detection sensitivity among the exhaust gases discharged from the respective combustion chambers. That is, the specific combustion chamber in each of the above embodiments may be the combustion chamber discharging the exhaust gas that is most influential to the average air-fuel ratio of the internal combustion engine when the value obtained by equally correcting the reference fuel injection amount such that the average air-fuel ratio of the internal combustion engine matches the target air-fuel ratio based on the detected air-fuel ratio of the exhaust gas discharged from each combustion chamber is set as the target fuel injection amount associated with each combustion chamber, in other words, the combustion chamber discharging the exhaust gas that most dominantly influences the control of the average air-fuel ratio of the internal combustion engine.

In this case, the following effect is obtained. That is, when the combustion chamber that discharges the exhaust gas whose air-fuel ratio is detected by the air-fuel ratio sensor with the highest sensitivity (hereinafter this exhaust gas is referred to as "a highest sensitivity exhaust gas") is the specific combustion chamber, according to the individual air-fuel ratio control of each of the above embodiments, the non-specific air-fuel ratio is controlled based on the air-fuel ratio of the highest sensitivity exhaust gas. Herein, in a case where the individual air-fuel ratio control is executed when the catalyst temperature increase control is executed and the specific air-fuel ratio is controlled to a rich air-fuel ratio, the non-specific air-fuel ratio is controlled to a significantly lean air-fuel ratio. As a result, a misfire is very likely to occur in the non-specific combustion chamber. However, in each of the above embodiments, when the catalyst temperature increase control is executed, the execution of the individual air-fuel ratio control is prohibited. Consequently, according to each of the above embodiments, an effect is obtained that, in a situation where the misfire is very likely to occur in the combustion chamber if the individual air-fuel ratio control is executed, the occurrence of the misfire in the combustion chamber is suppressed, and deterioration of exhaust emission characteristics is thereby suppressed.

Next, a description is given of non-individual air-fuel ratio control that can be adopted as the non-individual air-fuel ratio control of each of the above embodiments. Note that, in the following description, an embodiment in which the adoptable non-individual air-fuel ratio control is adopted is referred to as "a seventh embodiment". In the non-individual air-fuel ratio control of the seventh embodiment, the air-fuel ratio of the air-fuel mixture generated in each combustion chamber is controlled irrespective of the specific air-fuel ratio.

Specifically, during the operation of the engine, the reference fuel injection amount Qb corresponding to the present engine rotation speed Ne and the present required engine torque TQr is acquired from the map of FIG. 5A. Subsequently, the acquired reference fuel injection amount Qb is set as the target fuel injection amount associated with each of the specific combustion chamber and the non-specific combustion chamber.

In addition, during the operation of the engine, the reference intake air amount Gab corresponding to the present engine rotation speed NE and the present required engine torque TQr is acquired from the map of FIG. 5B. Subsequently, the acquired reference intake air amount Gab is set as the target intake air amount.

Then, the command signal for causing each fuel injection valve to inject the fuel in the set target fuel injection amount is calculated based on the target fuel injection amount. The calculated command signal is supplied to each fuel injection valve. Further, the control signal for controlling the throttle valve such that the throttle valve opening degree is controlled so as to achieve the set target intake air amount is supplied to the throttle valve actuator.

Next, a description is given of another non-individual air-fuel ratio control that can be adopted as the non-individual air-fuel ratio control of each of the above embodiments. Note that, in the following description, an embodiment in which the other adoptable non-individual air-fuel ratio control is adopted is referred to as "an eighth embodiment". In the non-individual air-fuel ratio control of the eighth embodiment, based on the specific air-fuel ratio and the non-specific air-fuel ratio, the air-fuel ratio of the air-fuel mixture generated in each combustion chamber is controlled such that the average air-fuel ratio of the internal combustion engine matches the target air-fuel ratio.

Specifically, during the operation of the engine, the reference fuel injection amount Qb corresponding to the present engine rotation speed NE and the present required engine torque TQr is acquired from the map of FIG. 5A. Subsequently, a value obtained by correcting the acquired reference fuel injection amount Qb with the air-fuel ratio correction factor is set as the target fuel injection amount associated with each of the specific combustion chamber and the non-specific combustion chamber.

More specifically, for example, as shown in the following equation (6), the value obtained by multiplying the acquired reference fuel injection amount Qb by the air-fuel ratio correction factor Kaf is set as a target fuel injection amount Qt associated with each of the specific combustion chamber and the non-specific combustion chamber. Note that the air-fuel ratio correction factor of the eighth embodiment is the same as the air-fuel ratio correction factor of the second embodiment.

$$Qt=Qb \times Kaf \qquad (6)$$

In addition, during the operation of the engine, the reference intake air amount Gab corresponding to the present engine rotation speed NE and the present required engine torque TQr is acquired from the map of FIG. 5B. Subsequently, the acquired reference intake air amount Gab is set as the target intake air amount.

Then, the command signal for causing each fuel injection valve to inject the fuel in the set target fuel injection amount is calculated based on the target fuel injection amount. The calculated command signal is supplied to each fuel injection valve. Further, the control signal for controlling the throttle valve such that the throttle valve opening degree is controlled so as to achieve the set target intake air amount is supplied to the throttle valve actuator.

Note that, in the above embodiment, the air-fuel ratio of the air-fuel mixture generated in each combustion chamber is controlled so as to correspond to the target air-fuel ratio by controlling the target fuel injection amount associated with each combustion chamber. However, if the intake air amount for each combustion chamber can be controlled, the air-fuel ratio of the air-fuel mixture generated in each combustion chamber may be controlled so as to correspond to the target air-fuel ratio by controlling the target intake air amount associated with each combustion chamber, instead of or in addition to controlling the target fuel injection amount associated with each combustion chamber.

Figure 6:
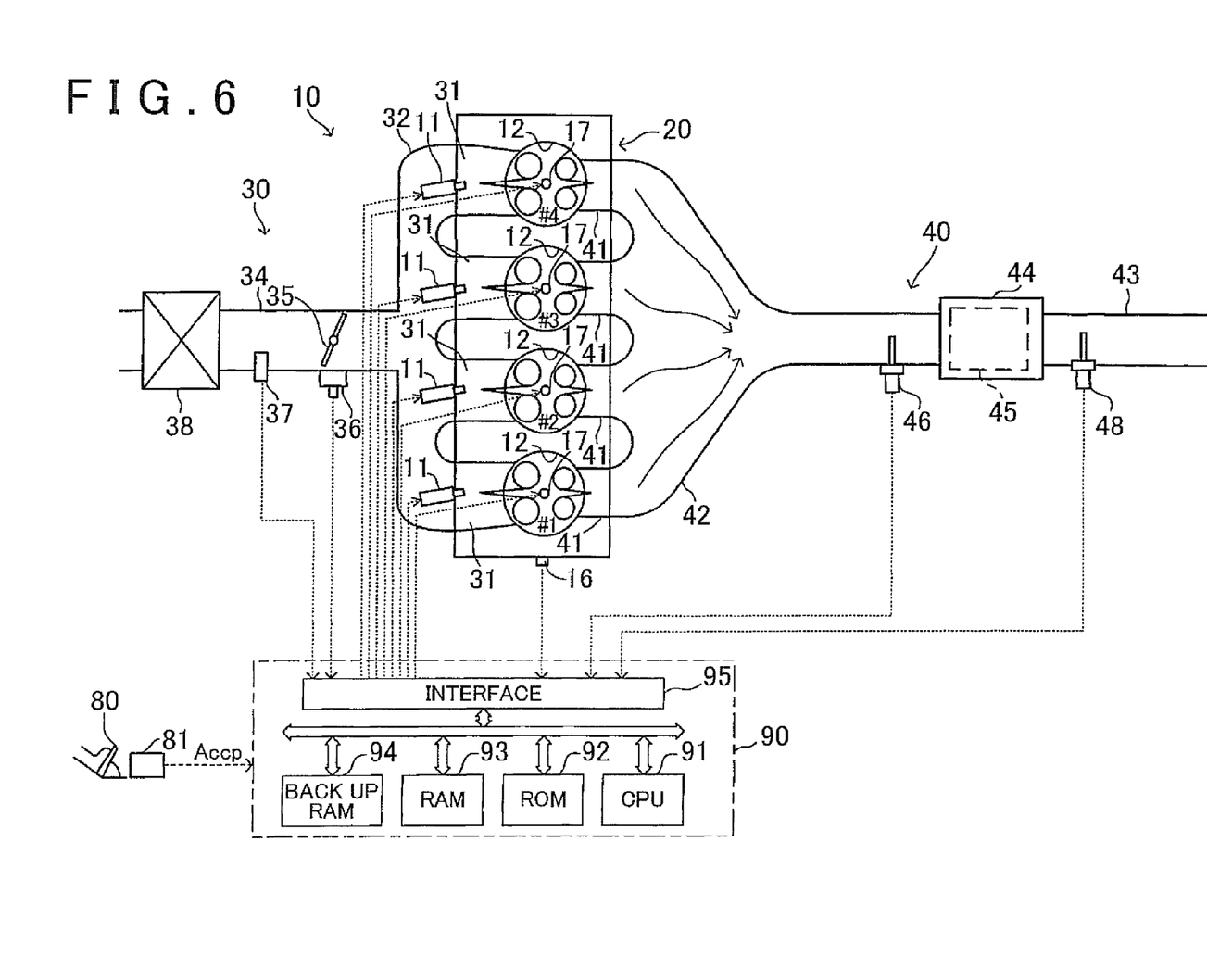
FIG. 6 is a view showing an internal combustion engine to which the control apparatus of the invention is applicable.

In addition, the invention is applicable to an internal combustion engine that includes an air-fuel ratio sensor (hereinafter this air-fuel ratio sensor is referred to as "a downstream side air-fuel ratio sensor") 48 attached to the exhaust passage 40 (more specifically the exhaust pipe 43) at a position downstream of the catalytic converter 44 as shown in FIG. 6, wherein individual air-fuel ratio control is executed in which the non-specific air-fuel ratio is controlled such that the average air-fuel ratio of the internal combustion engine matches the target air-fuel ratio by using the air-fuel ratio of the specific exhaust gas detected by the downstream side air-fuel ratio sensor 48 in addition to or instead of the air-fuel ratio of the specific exhaust gas detected by the air-fuel ratio sensor (hereinafter this air-fuel ratio sensor is referred to as "an upstream side air-fuel ratio sensor") 46 attached to the exhaust passage 40 at a position upstream of the catalytic converter 44.

Further, the invention is applicable to the internal combustion engine shown in FIG. 6, wherein non-individual air-fuel ratio control is executed in which the specific air-fuel ratio and the non-specific air-fuel ratio are controlled such that the average air-fuel ratio of the internal combustion engine matches the target air-fuel ratio by using the air-fuel ratio of each of the specific exhaust gas and the non-specific exhaust gas detected by the downstream side air-fuel ratio sensor 48 in addition to or instead of the air-fuel ratio of each of the specific exhaust gas and the non-specific exhaust gas detected by the upstream side air-fuel ratio sensor 46. Note that, in a case where the invention is applied to the internal combustion engine wherein the non-individual air-fuel ratio control is executed in which the specific air-fuel ratio and the non-specific air-fuel ratio are controlled such that the average air-fuel ratio of the internal combustion engine matches the target air-fuel ratio by using the air-fuel ratio of each of the specific exhaust gas and the non-specific exhaust gas detected by the downstream side air-fuel ratio sensor in addition to the air-fuel ratio of each of the specific exhaust gas and the non-specific exhaust gas detected by the upstream side air-fuel ratio sensor, when the catalyst temperature increase control is executed, the specific air-fuel ratio and the non-specific air-fuel ratio may be controlled such that the average air-fuel ratio of the internal combustion engine matches the target air-fuel ratio by using the air-fuel ratio of each of the specific exhaust gas and the non-specific exhaust gas detected by the upstream side air-fuel ratio sensor without using the air-fuel ratio of each of the specific exhaust gas and the non-specific exhaust gas detected by the downstream side air-fuel ratio sensor.

Moreover, the invention is applicable to a compression ignition internal combustion engine (what is called a diesel engine).

What is claimed is:

1. A control apparatus for an internal combustion engine including a plurality of combustion chambers, an exhaust passage common to all of the combustion chambers, an air-fuel ratio detection portion that detects an air-fuel ratio of an exhaust gas in the exhaust passage, and a catalyst that cleans exhaust gases, the control apparatus comprising:

a controller configured to execute individual air-fuel ratio control in which an air-fuel ratio of an air-fuel mixture generated in at least one non-specific combustion chamber is controlled such that an average air-fuel ratio of the internal combustion engine matches a target air-fuel ratio, based on an air-fuel ratio of an air-fuel mixture generated in at least one specific combustion chamber, the at least one specific combustion chamber being at least one of the plurality of combustion chambers that discharges a highest sensitivity exhaust gas that is the exhaust gas whose air-fuel ratio is detected by the air-fuel ratio detection portion with the highest detection sensitivity among the exhaust gases discharged from the plurality of combustion chambers, the at least one non-specific combustion chamber including the plurality of combustion chambers except the at least one specific combustion chamber, the controller being configured to execute catalyst temperature increase control in which a temperature of the catalyst is increased, and the controller being configured to prohibit execution of the individual air-fuel ratio control when the catalyst temperature increase control is executed, and the controller being configured to use the air-fuel ratio of the exhaust gas discharged from the at least one specific combustion chamber detected by the air-fuel ratio detection portion as the air-fuel ratio of the air-fuel mixture generated in the at least one specific combustion chamber in the individual air-fuel ratio control.

2. The control apparatus according to claim 1, wherein the internal combustion engine further includes a plurality of fuel supply portions that supply fuel to the corresponding combustion chambers, and the controller is configured to control the air-fuel ratio of the air-fuel mixture generated in the at least one non-specific combustion chamber by controlling an amount of the fuel supplied to the at least one non-specific combustion chamber from at least one of the fuel supply portions, which corresponds to the at least one non-specific combustion chamber.

3. A control method for an internal combustion engine including a plurality of combustion chambers, an exhaust passage common to all of the combustion chambers, an air-fuel ratio detection portion that detects an air-fuel ratio of an exhaust gas in the exhaust passage, and a catalyst that cleans exhaust gases, comprising:

determining whether or not catalyst temperature increase control in which a temperature of the catalyst is increased is executed; and prohibiting, when it is determined that the catalyst temperature increase control is executed, execution of individual air-fuel ratio control in which an air-fuel ratio of an air-fuel mixture generated in at least one non-specific combustion chamber is controlled such that an average air-fuel ratio of the internal combustion engine matches a target air-fuel ratio, based on an air-fuel ratio of an air-fuel mixture generated in at least one specific combustion chamber, the at least one specific combustion chamber being at least one of the plurality of combustion chambers that discharges a highest sensitivity exhaust gas that is the exhaust gas whose air-fuel ratio is detected by the air-fuel ratio detection portion with the highest detection sensitivity among the exhaust gases discharged from the plurality of combustion chambers, and the at least one non-specific combustion chamber including the plurality of combustion chambers except the at least one specific combustion chamber, wherein the air-fuel ratio of the air-fuel mixture generated in the at least one specific combustion chamber in the individual air-fuel ratio control is the air-fuel ratio of the exhaust gas discharged from the at least one specific combustion chamber detected by the air-fuel ratio detection portion as the air-fuel ratio of the air-fuel mixture generated in the at least one specific combustion chamber in the individual air-fuel ratio control.

* * * * *